April 12, 1949.  P. REDLER ET AL  2,466,781
PORTABLE ELECTRIC STOVE
Filed April 19, 1947

INVENTORS
PHILIP REDLER, CHARLES
DAVIES AND SIDNEY UNGER
BY
Bertram Ottinger
ATTORNEY Patented Apr. 12, 1949

2,466,781

UNITED STATES PATENT OFFICE 2,466,781

PORTABLE ELECTRIC STOVE

Philip Redler, Brooklyn, Charles Davies, New Rochelle, and Sidney Unger, New York, N. Y., assignors to Kord Manufacturing Co., Inc., New York, N. Y., a corporation of New York Application April 19, 1947, Serial No. 742,560

3 Claims. (Cl. 219—37)

This invention relates to portable electric stoves.

It is an object of our invention to provide a portable electric stove having a neat and attractive appearance, and a durable, inexpensive and sturdy construction which is internally simple.

It is another object of our invention to provide a portable electric stove which will drain to its interior any liquids spilling out of utensils on the stove and which will accumulate such liquids in a receptacle, e. g. a drip tray, within and removable from the stove. It is a more limited object of this aspect of our invention to provide a portable electric stove having an inconspicuous drip tray the support wherefor is provided by a novel fashioning and arrangement of the structural components of the stove, rather than the addition to new structural components for the particular purpose.

It is a further object of our invention to provide a portable electric stove which is internally ventilated to keep the casing cool around the burners and the switches, and in which said ventilation is accomplished without detracting from the appearance of the stove.

It is a more specific object of our invention to provide a portable electric stove in which the casing is so constructed and wherein ventilating openings for admission of air at the front of the casing are so located that said openings are unnoticeable.

Other objects of our invention will in part be obvious and in part be hereinafter pointed out.

Our invention accordingly consists in the features of construction, combinations of elements, and arrangement of parts, which will be exemplified in the construction hereinafter described and of which the scope of application will be indicated in the appended claims.

In the accompanying drawings, in which is shown one of the various possible embodiments of our invention, Fig. 1 is a front elevational view of a portable electric table stove constructed in accordance with our invention;

Figure 1:
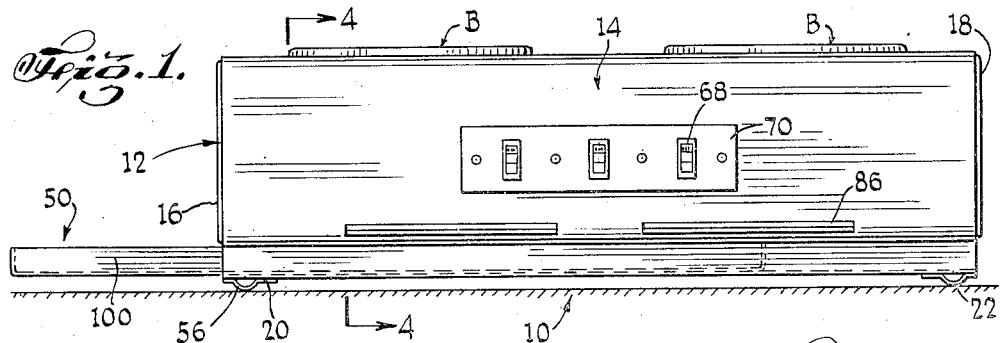
Figure 2:
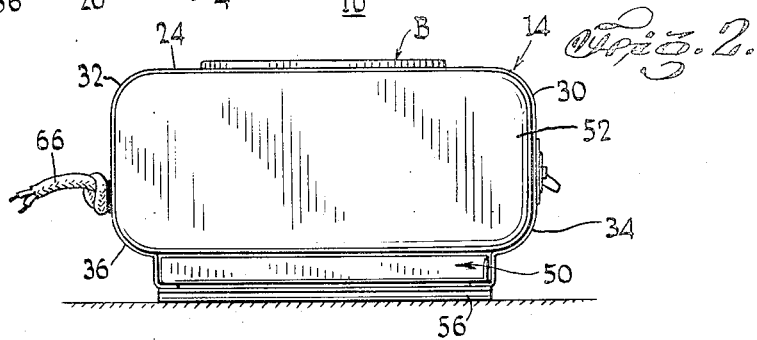
Fig. 2 is a side elevational view thereof.
Figure 3:
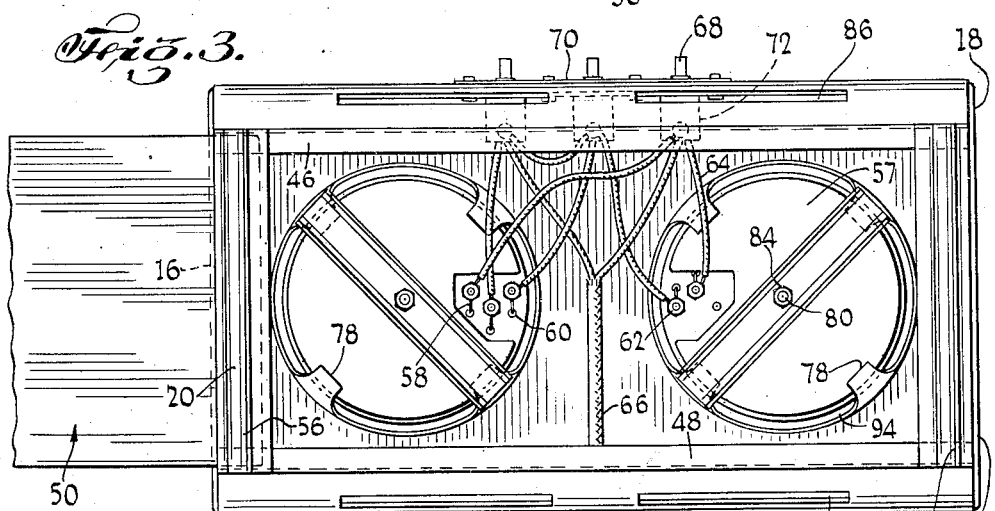
Fig. 3 is a bottom view of the stove with the drip tray almost wholly withdrawn.
Figure 4:
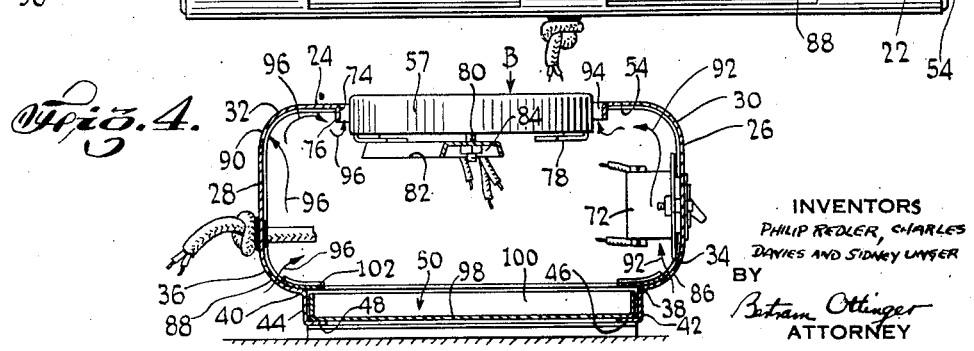
Fig. 4 is a sectional view taken substantially along the line 4—4 of Fig. 1.

Referring now in detail to the drawings, 10 denotes a two-burner portable electric table stove embodying our invention. Said stove includes a casing 12 having a rectangular plan contour suitably dimensioned to accommodate a pair of conventional electric burners B, it being understood that the number of burners employed is shown by way of illustration only, and is in no wise to be considered as limitative.

Pursuant to a feature of our invention the casing 12 consists of very few (five) parts each of which has an essentially simple, sheet metal construction, and which are assembled and secured to one another in an uncomplicated manner so that the stove can be manufactured at a low price. These parts are a main body section 14, a pair of end members 16, 18 and a pair of elongated ribbed leg elements 20, 22.

The main body section 14 is made from a single piece of sheet metal formed in accordance with standard sheet metal practice to comprise a top panel 24 and front and back panels 26, 28 integrally joined to the top panel along the upper front and back edges of the stove by sections 30, 32 having a generously curved contour in the order of a one-inch radius of curvature. The bottom edges of the panels 26, 28 terminate at inwardly extending integral sections 34, 36 having a similar generous curvature. The purpose of this ample curvature, particularly of the front lower section 34, and to a lesser extent of the back upper and lower section 32, 36, will be pointed out hereinafter.

The inner edges of the lower front and back sections 34, 36 are connected by abrupt bends 38, 40 to legs 42, 44 which terminate at inwardly extending feet 46, 48. The height of and spacing between said legs is such as to slidably accommodate a shallow removable drip tray 50, hereinafter described in detail, for which the feet 46, 48 serve as supporting tray slides.

The open sides of the main body section are closed by the end members 16, 18 each of which is made from a single piece of sheet metal including an end panel 52 shaped for snug reception within an open side of the main body section. Said panel is provided with integral inturned flanges 54 along all its edges. These flanges are in face-to-face contact with the inner, side edge surfaces of the top, front, and back panels 24, 26, 28 and of the several curved sections 30—36, and are rigidly, and permanently secured thereto, as by spot welding, at suitably spaced intervals whereby to form a rigid, durable and sturdy casing for the stove.

The tray slides are tied together by the leg elements 20, 22, each of which runs in a front-to-back direction. Each leg element is fabricated from a single elongated strip of sheet metal and has a downwardly extending rib 56 to maintain the stove spaced in the main from a supporting surface. The ends of the leg elements are rigidly and permanently secured to the undersurfaces of the tray slides, as by spot welding.

Any type of standard construction can be used for the burners B, that illustrated herein comprising a thick circular baked ceramic disc 57 with a serpentine groove on its upper surface in which one or more spiral resistance heating coils (not shown) are disposed. The ends 58 of said coils are run through apertures 60 in the disc and are connected to terminals 62 to which leads 64 are attached. Said leads place the heating coils in circuit with a power cable 66 through a set of switches 68 by means of which the coils can be energized at will. The switches are mounted on a face plate 70 secured to the front panel 26, said switches extending through a large opening in the panel 26 and having their bodies 72 disposed within the casing 12 immediately behind the front panel.

Each ceramic disc 57 is fitted into a matching aperture 74 cut in the top panel 24, said aperture being provided with a depending peripheral flange 76 to prevent a raw metal edge from being exposed. Four inturned depressed horizontal fingers 78 are formed integrally with the flange 76 to provide a ledge or seat on which the disc 57 rests. The disc is captively held in place by a bolt 80 whose head is received in a countersunk recess (not shown) in the top surface of the disc and whose shank passes through a hole in the disc and through a registered hole in a channel-shaped bridging strut 82. A nut 84 is threaded on the lower end of the bolt shank and made fast against the under surface of the strut. Said strut spans a pair of the fingers 78 and is held tight against the under-surfaces thereof. This arrangement allows the burners to be removed and replaced easily, particularly since, as soon will be seen, access to the interior of the stove can be had readily through the stove bottom so that the nut 84 can be reached handily for tightening or loosening.

There is a tendency for the heat generated by burners and in switches to raise the casings of electric stoves to a temperature so high that it deleteriously affects the switches and the insulation on the wires. We have overcome such difficulty, without the use of costly insulation and without rendering the stove unsightly, by providing ventilating openings in the shape of slots 86, 88, 90 in the curved sections 34, 36, 32, respectively. These slots extend lengthwise of the stove and are disposed at zones in the sections 32, 34, 36 having an inclination to the horizontal of about 45°. As a result of this arrangement, the slots 86 at the front of the casing are out of the normal line of sight and do not mar the simple lines of the casing. Nevertheless, said slots are so close to the front panel that air entering through them can play on said panel and keep the panel cool. Thus, ventilating air, whose direction of flow is indicated by the arrows 92, passes over the switch bodies 72 and beneath the top panel 24, finally exiting from the casing through the annular passageway 94 between the discs 57 and peripheral flanges 76. It will be observed that no ventilating opening is formed in the curved section 30 to detract from the appearance of the stove. The direction of flow of ventilating air entering through the slots 88 is indicated by the arrows 96.

Attention is directed to the fact that no direct contact exists between the heated discs 57 and the top panel 24. All heat transmitted by conduction must flow through the relatively narrow fingers which are in the stream of ventilating air and all heat transmitted by radiation must span the passageway 94 where it will strike the flange 76 which likewise is cooled by ventilating air.

In addition to serving as an exit port for ventilating air, the annular passageways function as drain openings for allowing spilt fluids, particles and scraps to pass through the top panel 24. To further this function the interior of the casing is unobstructed and the bottom of the casing is left open, being, however, removably closed by the drip tray 58. Said tray is in the form of a shallow, easily cleaned receptacle comprising a rectangular base wall 98 having an erect peripheral flange 100 whose height is slightly less than that of the legs 42. The tray can be introduced at either side of the casing into an opening whose bottom comprises a leg element 20, 22, whose top is the portion of an end panel flange 54 at the bottom of an end member 16, 18 and whose sides are the legs 44. Said tray is slidable lengthwise (end-to-end) of the casing and is just long enough to reach from side opening to side opening, whereby its end flange portions will appear to form part of the end wall of the casing.

If desired, the tray may be prevented from tilting, when partly withdrawn or inserted, by a pair of retaining plates 102 welded to the inner surfaces of the curved sections 34, 36 and having portions overhanging the tray slides 46, 48.

It will thus be seen that we have provided a portable electric stove which accomplishes the several objects of our invention and is well adapted to meet the conditions of practical use.

As various possible embodiments might be made of the above invention, and as various changes might be made in the embodiment above set forth, it will be understood that the invention as shown and described herein is only to be considered as illustrative and in no wise limitative.

Having thus described our invention, we claim as new and desire to secure by Letters Patent:

1. A portable electric stove comprising a casing which has a main body section, a pair of end members and a pair of elongated ribbed leg elements, said main body section including in one piece a top panel, front and back panels joined to the top panel by curved sections and tray slides joined to the front and back panels by curved sections and running from end to end of the casing, said end members closing off the ends of the main body section and being rigidly joined thereto, the bottom edges of the end members being spaced above the tray slides, the leg elements running from front to back of the casing and being rigidly joined to the tray slides, a drip tray slidably received on the tray slides and removable endwise of the casing, the ends of said tray filling the space between the bottom edges of the end members and the tray slides, said top panel having at least one opening therein from the edges of which depressed fingers extend inwardly of the opening, an electric burner element seated on said fingers and peripherally spaced from the edge of said opening to form an annular drip and ventilating space, a switch for said burner mounted on the front panel, the curved section joining the front panel to a tray slide having a ventilating opening therein at about the 45° zone of the section, and tray retainer plates rigidly joined to the lower curved sections within the casing and having portions thereof disposed above the tray slides to prevent the drip tray from tilting.

2. A portable electric stove comprising a casing which has a main body section, a pair of end members and a pair of elongated ribbed leg elements, said main body section including in one piece a top panel, front and back panels joined to the top panel by curved sections and tray slides joined to the front and back panels by curved sections and running from end to end of the casing, said end members closing off the ends of the main body section and being rigidly joined thereto, the bottom edges of the end members being spaced above the tray slides, the leg elements running from front to back of the casing and being rigidly joined to the tray slides, a drip tray slidably received on the tray slides and removable endwise of the casing, the ends of said tray filling the space between the bottom edges of the end members and the tray slides, said top panel having at least one opening therein from the edges of which depressed fingers extend inwardly of the opening, an electric burner element seated on said fingers and peripherally spaced from the edge of said opening to form an annular drip and ventilating space and a switch for said burner mounted on the front panel, the curved section joining the front panel to a tray slide having a ventilating opening therein at about the 45° zone of the section.

3. A portable electric stove comprising a casing which has a main body section, a pair of end members and a pair of elongated ribbed leg elements, said main body section including in one piece a top panel, front and back panels joined to the top panel by curved sections and tray slides joined to the front and back panels by curved sections and running from end to end of the casing, said end members closing off the ends of the main body section and being rigidly joined thereto, the bottom edges of the end members being spaced above the tray slides, the leg elements running from front to back of the casing and being rigidly joined to the tray slides, and a drip tray slidably received on the tray slides and removable endwise of the casing, the ends of said tray filling the space between the bottom edges of the end members and the tray slides.

PHILIP REDLER.
CHARLES DAVIES.
SIDNEY UNGER.

REFERENCES CITED

The following references are of record in the file of this patent:

UNITED STATES PATENTS

| Number | Name | Date |
| --- | --- | --- |
| 1,706,908 | Westman | Mar. 26, 1929 |
| 1,751,219 | Seamon | Mar. 18, 1930 |
| 2,091,951 | Anthony | Sept. 7, 1937 |
| 2,150,492 | Cory | Mar. 14, 1939 |
| 2,417,977 | French | Mar. 25, 1947 |

FOREIGN PATENTS

| Number | Country | Date |
| --- | --- | --- |
| 110,239 | Austria | Apr. 11, 1940 |
| 648,707 | Germany | Aug. 7, 1937 |